US009509972B2

United States Patent
Yea et al.

(10) Patent No.: US 9,509,972 B2
(45) Date of Patent: Nov. 29, 2016

(54) ENCODING/DECODING METHOD AND APPARATUS USING A SKIP MODE

(75) Inventors: Sehoon Yea, Seoul (KR); Eunyong Son, Seoul (KR); Jaewon Sung, Seoul (KR); Jiwook Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 14/129,205

(22) PCT Filed: Jun. 21, 2012

(86) PCT No.: PCT/KR2012/004915
§ 371 (c)(1),
(2), (4) Date: Feb. 14, 2014

(87) PCT Pub. No.: WO2012/177063
PCT Pub. Date: Dec. 27, 2012

(65) Prior Publication Data
US 2014/0146137 A1 May 29, 2014

Related U.S. Application Data

(60) Provisional application No. 61/500,616, filed on Jun. 24, 2011.

(51) Int. Cl.
*H04N 7/18* (2006.01)
*H04N 13/00* (2006.01)
(Continued)

(52) U.S. Cl.
CPC ........ *H04N 13/0022* (2013.01); *H04N 19/105* (2014.11); *H04N 19/14* (2014.11); *H04N 19/154* (2014.11); *H04N 19/176* (2014.11); *H04N 19/187* (2014.11); *H04N 19/597* (2014.11)

(58) Field of Classification Search
USPC ........................................ 375/240.01–240.29
See application file for complete search history.

(56) References Cited

U.S. PATENT DOCUMENTS 6,445,815 B1 * 9/2002 Sato ..................... G06T 7/0042
348/E13.008
7,782,943 B2 8/2010 Jeon
(Continued)

FOREIGN PATENT DOCUMENTS

| CN | 1278349 | 12/2000 |
| CN | 1281569 | 1/2001 |

(Continued)

OTHER PUBLICATIONS

International Search Report dated Dec. 26, 2012 for Application No. PCT/KR2012/004915 with English Translation, 10 pages.
(Continued)

*Primary Examiner* — Leron Beck
(74) *Attorney, Agent, or Firm* — Fish & Richardson P.C.

(57) ABSTRACT

Disclosed are an encoding/decoding method and apparatus using a skip mode. The image decoding method comprises: generating a warping prediction depth image unit, and then decoding skip information regarding an image unit to be decoded; and decoding the image unit to be decoded using a skip mode based on the skip information. The skip information may be determined based on depth information of the warping prediction depth image unit, depth information of the image unit to be decoded, or edge information of a text picture image unit corresponding to the image unit to be decoded. Thus, an unnecessary prediction process need not be performed during the encoding and decoding of the image unit, thereby improving image encoding and decoding efficiency.

10 Claims, 12 Drawing Sheets

(51) Int. Cl.
*H04N 19/597* (2014.01)
*H04N 19/105* (2014.01)
*H04N 19/176* (2014.01)
*H04N 19/14* (2014.01)
*H04N 19/154* (2014.01)
*H04N 19/187* (2014.01)

(56) References Cited

U.S. PATENT DOCUMENTS

| | | | |
|---|---|---|---|
| 7,782,944 B2 | 8/2010 | Jeon | |
| 7,782,945 B2 | 8/2010 | Jeon | |
| 7,782,946 B2 | 8/2010 | Jeon | |
| 7,782,947 B2 | 8/2010 | Jeon | |
| 7,782,948 B2 | 8/2010 | Jeon | |
| 7,782,949 B2 | 8/2010 | Jeon | |
| 7,782,950 B2 | 8/2010 | Jeon | |
| 8,170,108 B2 | 5/2012 | Jeon | |
| 8,325,814 B2 | 12/2012 | Koo | |
| 8,532,410 B2* | 9/2013 | Tian | H04N 19/597 |
| | | | 382/232 |
| 2003/0202594 A1* | 10/2003 | Lainema | H04N 19/176 |
| | | | 375/240.16 |
| 2007/0041658 A1* | 2/2007 | Mishima | G06K 9/6206 |
| | | | 382/278 |
| 2008/0117976 A1* | 5/2008 | Lu | H04N 19/139 |
| | | | 375/240.16 |
| 2008/0170618 A1 | 7/2008 | Choi | |
| 2008/0273599 A1 | 11/2008 | Park | |
| 2009/0279608 A1 | 11/2009 | Jeon | |
| 2009/0296811 A1 | 12/2009 | Jeon | |
| 2010/0020870 A1 | 1/2010 | Jeon | |
| 2010/0026882 A1 | 2/2010 | Jeon | |
| 2010/0026883 A1 | 2/2010 | Jeon | |
| 2010/0026884 A1 | 2/2010 | Jeon | |
| 2010/0027653 A1 | 2/2010 | Jeon | |
| 2010/0027654 A1 | 2/2010 | Jeon | |
| 2010/0027659 A1 | 2/2010 | Jeon | |
| 2010/0027660 A1 | 2/2010 | Jeon | |
| 2010/0027682 A1 | 2/2010 | Jeon | |
| 2010/0046619 A1 | 2/2010 | Koo | |
| 2010/0074334 A1 | 3/2010 | Jeon | |
| 2010/0080293 A1 | 4/2010 | Jeon | |
| 2010/0086036 A1 | 4/2010 | Jeon | |
| 2010/0091843 A1 | 4/2010 | Jeon | |
| 2010/0091844 A1 | 4/2010 | Jeon | |
| 2010/0091845 A1 | 4/2010 | Jeon | |
| 2010/0091883 A1 | 4/2010 | Jeon | |
| 2010/0091884 A1 | 4/2010 | Jeon | |
| 2010/0091885 A1 | 4/2010 | Jeon | |
| 2010/0091886 A1 | 4/2010 | Jeon | |
| 2010/0104012 A1 | 4/2010 | Koo | |
| 2010/0104014 A1 | 4/2010 | Koo | |
| 2010/0111169 A1 | 5/2010 | Jeon | |
| 2010/0111170 A1 | 5/2010 | Koo | |
| 2010/0111171 A1 | 5/2010 | Koo | |
| 2010/0111172 A1 | 5/2010 | Koo | |
| 2010/0111173 A1 | 5/2010 | Koo | |
| 2010/0111174 A1 | 5/2010 | Koo | |
| 2010/0128787 A1 | 5/2010 | Jeon | |
| 2010/0150234 A1 | 6/2010 | Koo | |
| 2010/0150235 A1 | 6/2010 | Koo | |
| 2010/0150236 A1 | 6/2010 | Koo | |
| 2010/0158112 A1 | 6/2010 | Koo | |
| 2010/0158113 A1 | 6/2010 | Koo | |
| 2010/0158114 A1 | 6/2010 | Koo | |
| 2010/0158117 A1 | 6/2010 | Koo | |
| 2010/0158118 A1 | 6/2010 | Koo | |
| 2010/0158129 A1* | 6/2010 | Lai | H04N 19/597 |
| | | | 375/240.16 |
| 2010/0177824 A1 | 7/2010 | Koo | |
| 2010/0202519 A1 | 8/2010 | Koo | |
| 2010/0202521 A1 | 8/2010 | Koo | |
| 2010/0215100 A1 | 8/2010 | Jeon | |
| 2010/0260265 A1 | 10/2010 | Jeon | |
| 2010/0316135 A1 | 12/2010 | Jeon | |
| 2010/0316136 A1 | 12/2010 | Jeon | |
| 2010/0316360 A1 | 12/2010 | Jeon | |
| 2010/0316361 A1 | 12/2010 | Jeon | |
| 2010/0316362 A1 | 12/2010 | Jeon | |
| 2011/0142138 A1* | 6/2011 | Tian | H04N 13/0022 |
| | | | 375/240.24 |
| 2011/0170593 A1* | 7/2011 | Kim | H04N 19/103 |
| | | | 375/240.12 |
| 2012/0183066 A1* | 7/2012 | Oh | H04N 19/132 |
| | | | 375/240.13 |
| 2012/0314027 A1* | 12/2012 | Tian | H04N 7/181 |
| | | | 348/43 |
| 2013/0162773 A1* | 6/2013 | Tian | H04N 19/597 |
| | | | 348/43 |
| 2014/0085416 A1* | 3/2014 | Chang | H04N 13/0048 |
| | | | 348/43 |

FOREIGN PATENT DOCUMENTS

| | | |
|---|---|---|
| CN | 1830217 | 6/2011 |
| KR | 10-2008-0022055 A | 3/2008 |
| KR | 10-2008-0066522 A | 7/2008 |
| KR | 10-2008-0097914 A | 11/2008 |
| WO | WO 2007/114608 A1 | 10/2007 |
| WO | WO 2007/114609 A1 | 10/2007 |
| WO | WO 2007/114610 A1 | 10/2007 |
| WO | WO 2007/114611 A1 | 10/2007 |
| WO | WO 2007/114612 A1 | 10/2007 |
| WO | WO 2007/148906 A1 | 12/2007 |
| WO | WO 2007/148907 A1 | 12/2007 |
| WO | WO 2007/148909 A1 | 12/2007 |
| WO | WO 2008/023967 A1 | 2/2008 |
| WO | WO 2008/023968 A1 | 2/2008 |
| WO | WO 2008/084997 A1 | 7/2008 |
| WO | WO 2008/136607 A1 | 11/2008 |
| WO | WO 2009/023091 A2 | 2/2009 |
| WO | 2010/093350 | 8/2010 |

OTHER PUBLICATIONS

Chen et al., "A New Block-Matching Criterion for Motion Estimation and Its Implementation," IEEE Transactions on Circuits and Systems for Video Technology, 5(3):231-235; Jun. 1, 1995.

Extended European Search Report issued in European Application No. 12802291.0 on Jun. 1, 2016, 13 pages.

Kim et al., "Depth map coding with distortion estimation of rendered view," Optical Sense II, vol. 7543, Jan. 17, 2010, p. 75430B.

Kim et al., "Depth map distortion analysis for view rendering and depth coding," Image Processing (ICIP), 2009 16th IEEE International Conference on, Nov. 7, 2009, pp. 721-724.

Lee et al., "A Fast and Efficient Multi-View Depth Image Coding Method Based on Temporal and Inter-View Correlations of Texture Images," IEEE Transactions on Circuits and Systems for Video Technology, 21(12):1859-1868, May 12, 2011.

Morvan et al. "Multiview Depth-Image Compression Using an Extended H.264 Encoder," Advanced Concepts for Intelligent Vision Systems, Lecture Notes in Computer Science, Aug. 28, 2007, pp. 675-686.

\* cited by examiner

ENCODING/DECODING METHOD AND APPARATUS USING A SKIP MODE

CROSS REFERENCE TO RELATED APPLICATIONS

This application is a U.S. National Phase Application under 35 U.S.C. §371 of International Application PCT/KR2012/004915, filed on Jun. 21, 2012, which claims the benefit of U.S. Provisional Application No. 61/500,616, filed on Jun. 24, 2011, the entire content of the prior applications is hereby incorporated by reference.

TECHNICAL FIELD

The present invention relates to encoding/decoding method and device using a skip mode, and more particularly, to method and device for encoding/decoding a multi-view video using a skip mode.

BACKGROUND ART

With improvements of signal processing techniques and network transmission techniques, various multimedia services have been made possible and demands for interactive multimedia contents and realized media contents have increased more and more. A multi-view video coding method which is one of various techniques used to create multimedia contents and realized media contents is a technique of allowing viewers to feel a stereoscopic effect at the time of watching a video created from multiple viewpoints.

A multi-view video can be used in various fields such as an FVV (free viewpoint video), an FTV (free viewpoint TV), a 3DTV, surveillance, and home entertainment. In recent years, the JVT (Joint Video Team) and the VCEG (Video Coding Expert Group) of the MPEG (Moving Picture Expert Group) have standardized MVC (Multi-view Video Coding) which is standard technology of the multi-view video coding techniques.

Unlike a single-view video, a multi-view video has a high correlation between neighboring image frames which are images of various viewpoints present in the same POC (Picture Order Count). In an existing video encoding method, repeated information can be reduced or removed using spatial/temporal/statistical correlations of a single-view video. In a multi-view video encoding method, an inter-view correlation can be additionally used in the existing method so as to reduce repeated information of a video. Since a multi-view video is obtained by simultaneously shooting the same scene using multiple cameras adjacent to each other, the multi-view video contains almost the same information except for parallax and slight illumination difference and thus has a very high inter-view correlation.

SUMMARY OF THE INVENTION

Technical Problem

An object of the present invention is to provide an encoding/decoding method using a skip mode with reference to a warped predicted depth picture or a reference picture which can enhance encoding efficiency and decoding efficiency of a video.

Another object of the present invention is to provide a device for performing an encoding/decoding method using a skip mode with reference to a warped predicted depth picture or a reference picture which can enhance encoding efficiency and decoding efficiency of a video.

Solution to Problem

According to an aspect of the present invention, there is provided a video decoding method including the steps of: creating a warped predicted depth video unit and decoding skip information of a decoding-target video unit; and decoding the decoding-target video unit using a skip mode on the basis of the skip information, wherein the skip information is information determined on the basis of depth information of the warped predicted depth video unit, depth information of the decoding-target video unit, and edge information of a video unit of a texture picture corresponding to the decoding-target video unit. The warping predicted depth video unit may be a picture which is obtained by warping a depth picture having the same POC (Picture Order Count) as a prediction-target depth picture at a viewpoint of the prediction-target depth picture. The skip information may be information which is calculated on the basis of the steps of: calculating a maximum depth difference value which is a maximum value of difference values between a depth value of the decoding-target video unit and a converted depth value of the warped predicted depth video unit; and determining whether an edge region is present in the video unit of a texture picture corresponding to the prediction-target depth video unit. The skip information may be information which is determined by at least one of the steps of: determining whether a value calculated using a first video rendering quality calculating method is greater than a first threshold value on the basis of the maximum depth difference value when an edge is present; and determining whether a value calculated using a second video rendering quality calculating method is greater than a second threshold value on the basis of the maximum depth difference value when an edge is not present.

According to another aspect of the present invention, there is provided a video decoding method including the steps of: creating a plurality of warped predicted depth video units and decoding skip information of a decoding-target video unit and index information of the warped predicted depth video unit to be used to perform a skip mode; and decoding the decoding-target video unit using a skip mode on the basis of the skip information and the index information, wherein the skip information is information determined on the basis of depth information of the warped predicted depth video unit, depth information of the decoding-target video unit, and edge information of a video unit of a texture picture corresponding to the decoding-target video unit. The index information of the warped predicted depth video unit may be index information of the warped predicted depth picture having a small difference from depth information of the decoding-target video unit out of the plurality of warped predicted depth video units. The skip information may be information which is calculated on the basis of the steps of: calculating a maximum depth difference value which is a maximum value of difference values between a depth value of the decoding-target video unit and a converted depth value of the warped predicted depth video unit; and determining whether an edge region is present in the video unit of a texture picture corresponding to the prediction-target depth video unit. The skip information may be information which is determined by at least one of the steps of: determining whether a value calculated using a first video rendering quality calculating method is greater than a first threshold value on the basis of the maximum depth difference value when an edge is present; and determining whether a value calculated using a second video rendering quality calculating method is greater than a second threshold value on the basis of the maximum depth difference value when an edge is not present.

According to still another aspect of the present invention, there is provided a video decoding method including the steps of: creating reference pictures and decoding skip information of a decoding-target video unit and index information of the reference picture to be used to perform a skip mode; and decoding the decoding-target video unit using a skip mode on the basis of the skip information, wherein the skip information is information determined on the basis of depth information of a warped predicted depth video unit, depth information of the decoding-target video unit, and edge information of a video unit of a texture picture corresponding to the decoding-target video unit. The reference pictures may include a warped predicted depth picture which is a reference picture subjected to warping and a non-warped predicted depth picture which is a reference picture not subjected to warping. The skip information may be information which is calculated on the basis of the steps of: calculating a maximum depth difference value which is a maximum value of difference values between a depth value of the decoding-target video unit and a converted depth value of the warped predicted depth video unit; and determining whether an edge region is present in the video unit of a texture picture corresponding to the prediction-target depth video unit. The skip information may be information which is determined by at least one of the steps of: determining whether a value calculated using a first video rendering quality calculating method is greater than a first threshold value on the basis of the maximum depth difference value when an edge is present; and determining whether a value calculated using a second video rendering quality calculating method is greater than a second threshold value on the basis of the maximum depth difference value when an edge is not present.

According to still another aspect of the present invention, there is provided a video decoder including: an entropy decoding module that decodes skip information of a decoding-target video unit; and a prediction module that creates a warped predicted depth video unit and decodes the decoding-target video unit using a skip mode on the basis of the skip information, wherein the skip information is information determined on the basis of depth information of the warped predicted depth video unit, depth information of the decoding-target video unit, and edge information of a video unit of a texture picture corresponding to the decoding-target video unit. The entropy decoding module may be an entropy decoding module that decodes index information of a video unit or a picture used for the skip mode of the decoding-target video unit when a plurality of warped predicted depth video units or a plurality of reference pictures are used. The prediction module may be a prediction module that uses depth information of one of the warped predicted depth video unit or the reference picture determined on the basis of the index information as depth information of the decoding-target video unit when the decoding-target video unit is decoded using the skip mode. The warping predicted depth video unit may be a picture which is obtained by warping a depth picture having the same POC (Picture Order Count) as a prediction-target depth picture at a viewpoint of the prediction-target depth picture. The skip information may be information which is calculated on the basis of the steps of: calculating a maximum depth difference value which is a maximum value of difference values between a depth value of the decoding-target video unit and a converted depth value of the warped predicted depth video unit; and determining whether an edge region is present in the video unit of a texture picture corresponding to the prediction-target depth picture. The skip information may be information which is determined by at least one of the steps of: determining whether a value calculated using a first video rendering quality calculating method is greater than a first threshold value on the basis of the maximum depth difference value when an edge is present; and determining whether a value calculated using a second video rendering quality calculating method is greater than a second threshold value on the basis of the maximum depth difference value when an edge is not present.

Advantageous Effects

In the encoding/decoding method and device using a skip mode according to the aspects of the present invention, it is possible to determine whether an encoding/decoding process is performed using a skip mode on the basis of video rendering quality calculated using a warped predicted depth picture, which is warped with a viewpoint of a prediction-target depth picture, or a reference picture. Therefore, since unnecessary prediction processes are not performed to encode and decode a video unit, it is possible to enhance encoding and decoding efficiency of a video.

DESCRIPTION OF EMBODIMENTS

Hereinafter, embodiments of the present invention will be described in detail with reference to the accompanying drawings. When it is determined that detailed description of known techniques or functions involved in the invention makes the gist of the invention obscure, the detailed description will not be made.

When it is mentioned that an element is "coupled" or "connected" to another element, it should be understood that still another element may be interposed therebetween, as well as that both elements may be coupled or connected directly to each other. An expression of "include" a specific element means that it does not exclude the other elements and an additional element may be included in an embodiment of the present invention or the technical scope of the present invention.

Terms such as "first" and "second" can be used to describe various elements, but the elements are not limited to the terms. The terms are used only to distinguish one element from another element. For example, without departing from the scope of the invention, a first element may be named a second element and the second element may be named the first element similarly.

Elements described in the embodiments of the invention are independently illustrated for the purpose of convenience of explanation on different specific functions, and do not mean that the elements are embodied by independent hardware or independent software modules, respectively. That is, the elements are illustrated and described as constituent modules for the purpose of convenience of explanation, two or more elements out of the elements may be combined to form a single element, or one element may be split into plural elements. Embodiments in which the elements are combined and/or split belong to the scope of the invention without departing from the concept of the invention.

Some elements may not be essential elements for performing essential functions of the invention but may be selective elements for merely improving performance. The invention may be embodied by only the elements essential to embody the invention, other than the elements used to merely improve performance, and a structure including only the essential elements other than the selective elements used to merely improve performance belongs to the scope of the invention.

Figure 1:
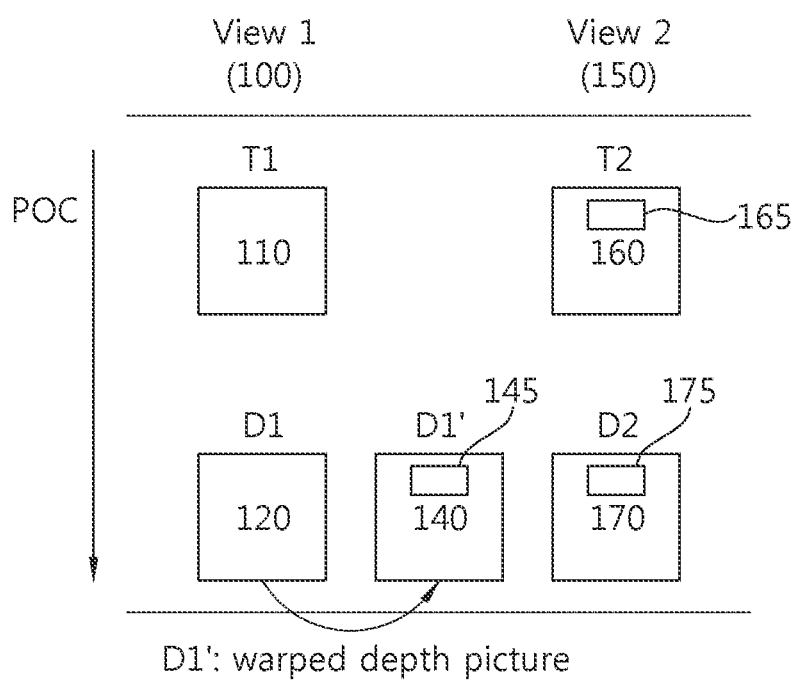
FIG. 1 is a conceptual diagram illustrating a VSP (View Synthesis Prediction) method according to an embodiment of the present invention.

FIG. 1 is a conceptual diagram illustrating a VSP (View Synthesis Prediction) method according to an embodiment of the present invention.

Referring to FIG. 1, a first view video 100 and a second view video 150 having the same POC (Picture Order Count) may be present. The videos having the same POC (Picture Order Count) may be videos having the same video output order. The first view video 100 may include a first texture picture 110 and a first depth picture 120, and the second view video 150 may include a second texture picture 160 and a second depth picture 170.

A predicted depth picture 140 for the second depth picture 170 which is present in a view other than the first view can be created by warping the first depth picture 120 using additional information such as a camera parameter and depth data. In the following embodiment of the invention, a depth picture which is obtained by performing a warping operation from one view to another view and which is used as a predicted depth picture is defined as a warped predicted depth picture, and a depth picture to be predicted is defined as a prediction-target depth picture.

Since depth information of the warped predicted depth picture 140 is a predicted value of depth information of the original second depth picture 170, a difference may be present between the depth information of the original second depth picture 170 and the warped predicted depth picture 140. According to an embodiment of the present invention, it can be determined whether the second depth picture 170 is encoded using a skip mode by comparing the depth information of the warped predicted depth picture 140 with video information of the second depth picture 170 in terms of coding efficiency.

The skip mode means an encoding method using video information included in the warped predicted depth picture 140 as a value of the video information of the prediction-target depth picture 170 in the same way. For example, when a prediction-target block 175 included in the prediction-target depth picture 170 uses a skip mode, the depth information of a block 145, which is present in the warped predicted depth picture 140, corresponding to the prediction-target block 175 may be used as the depth information of the prediction-target block 175.

The block corresponding to the prediction-target block 175 may be a block in the warped predicted depth picture 140 which includes points at the same positions as the prediction-target block 175 and which is located at the col-located position of the prediction-target block 175. The block 145 corresponding to the prediction-target block 175 may be a block which is present at a specified position in another picture calculated on the basis of a predetermined position calculating method with respect to the position of the prediction-target block 175.

Therefore, in encoding a video unit included in the same prediction-target depth picture 170 as the prediction-target block 175 at the time of performing an encoding process using a skip mode, additional information such as residual information, reference picture information, and motion vector information is not used and it is thus possible to enhance coding efficiency of a video.

In the following embodiments of the present invention, a method of predicting a block included in a prediction-target depth picture will be mainly described for the purpose of convenience of explanation. However, a video encoding method using a skip mode according to an embodiment of the present invention may be a method of predicting various video units (for example, a CU, a PU, a TU, an LCU, a macro block, a slice, a frame, and a picture) as well as a block unit. For example, a method of determining whether to encode a picture using a skip mode on values obtained by performing a prediction process in the unit of a picture may be used.

The term, "video unit", out of the terms used in the following embodiments of the present invention may be analyzed to include various video units such as a CU, a PU, a TU, an LCU, a macro block, a slice, a frame, and a picture.

Determination on whether to perform an encoding process using a skip mode may be performed on various video units as described above. For example, in order to determine whether to encode a specific video unit using a skip mode, it may be determined whether to use a skip mode to encode a prediction-target video unit 175 by calculating a difference value between depth information of the prediction-target video unit 175 and depth information of (a corresponding video unit 145 in) a warped predicted depth picture. Methods of determining whether to perform an encoding process using a skip mode on a specific video unit will be mentioned in brief below.

(1) In order to determine whether to use a skip mode in a method of encoding a video unit, the depth value of a video unit 145 of a warped predicted depth picture and the depth value of a video unit 175 of a prediction-target depth picture are compared to calculate a difference value therebetween.

The calculated difference value may be used to determine whether to performing an encoding process using a skip mode.

(2) As additional information for determining whether to encoding a video unit using a skip mode, it may be additionally determined whether a video unit 165 of a texture picture corresponding to a video unit 170 of a prediction-target depth picture includes an edge region.

For example, different methods of calculating rendering quality of a video may be applied to a case where the video unit 165 of a texture picture includes an edge and a case where the video unit 165 of the texture picture does not include an edge. When a video unit increases in size, for example, from a block unit to a picture unit, it may be determined whether to perform an encoding process using a skip mode on a picture unit by using edge number information as the information for determining whether to perform an encoding process using a skip mode.

(3) The rendering quality of a video may be calculated on the basis of the difference value between the depth information of the warped predicted depth video unit 145 and the depth information of the prediction-target depth video unit 175 calculated in the step of (1) and the edge information calculated in the step of (2). When the calculated rendering quality is smaller than a predetermined threshold value, a skip-mode encoding process may be performed on the corresponding video unit.

Only the videos of two viewpoints (the first view video 100 and the second view video 150) present at the same POC (Picture Order Count) are illustrated in FIG. 1 for the purpose of convenience of explanation, but videos of two or more views may be present at the same POC. This case is additionally illustrated in FIG. 3.

Figure 2:
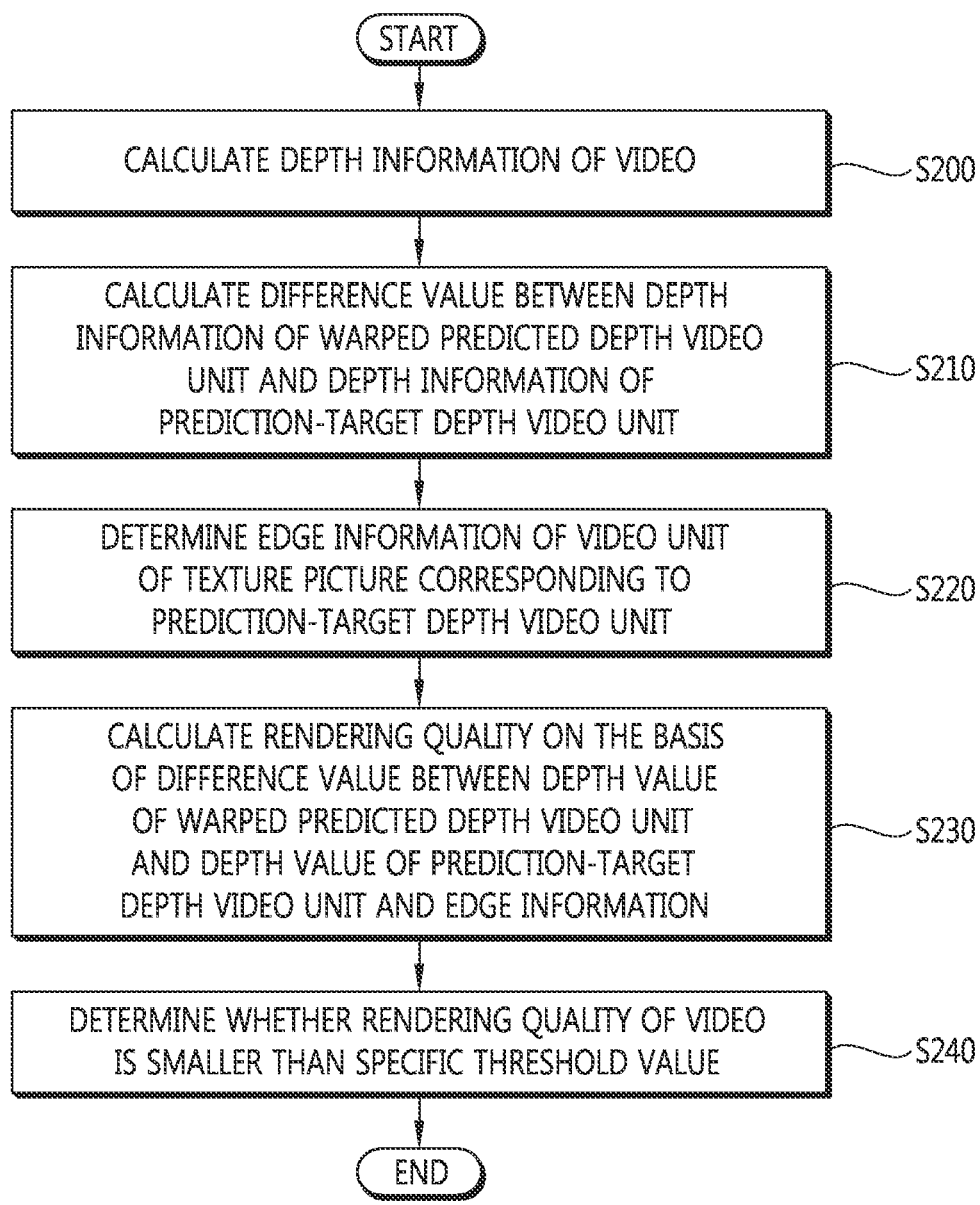
FIG. 2 is a flowchart illustrating a method of determining whether to encode a video unit using a skip mode according to an embodiment of the present invention.

FIG. 2 is a flowchart illustrating a method of determining whether to encode a video unit using a skip mode according to an embodiment of the present invention.

The steps of the flowchart illustrated in FIG. 2 are not necessarily sequentially performed but may be performed in a changed order when the steps can be performed in the changed coding order.

Hereinafter, expressions used in the embodiments of the present invention are examples for performing the method of determining whether to encode a specific video unit using a skip mode, and various expressions may be used.

Referring to FIG. 2, depth information of a video unit is calculated (step S200).

The depth information of a video unit may employ depth information of a video unit calculated with respect to a camera plane.

Expression 1 is an expression for calculating the depth information at coordinates (x, y) on an image plane of a camera.

$$L(x, y) = \text{Round}\left(\frac{\frac{1}{Z(x, y)} - \frac{1}{Z_{far}}}{\frac{1}{Z_{near}} - \frac{1}{Z_{far}}} \times 255\right) \quad \langle \text{Expression 1} \rangle$$

In Expression 1, $Z(x, y)$ represents an actual depth value of a depth picture, $Z_{far}$ represents the maximum depth value, and $Z_{near}$ represents the minimum depth value. The actual depth value $Z(x, y)$ may be converted into depth information $L(x, y)$ on the camera plane on the basis of Expression 1.

A difference value between the depth information of a warped predicted depth video unit and the depth information of a prediction-target depth video unit is calculated (step S210).

When whether to perform an encoding process using a skip mode is determined for one video unit, the depth information of the warped predicted depth video unit and the depth information of the prediction-target depth video unit may be compared to calculate the difference value therebetween. The calculated difference value may be used to calculate the rendering quality of a video in the subsequent steps.

Expression 2 is an expression representing a method of calculating the difference value between the depth information of the warped predicted depth video unit and the depth information of the prediction-target depth video unit using the depth information calculated using Expression 1.

$$Q_{depth} = \max_{(x,y) \in MB} \left| \overline{L^{p'}}(x, y) - L^{p'}(x, y) \right| \quad \langle \text{Expression 2} \rangle$$

In Expression 2, $\overline{L^{p*}}(x, y)$ represents the depth information of the warped predicted depth video unit and $L^{p*}(x, y)$ represents the depth information of the prediction-target depth video unit. In Expression 2, it is assumed that the maximum difference value is calculated by macro block units, but the process of step 210 may be applied to various video units as described above. For example, the difference value in depth information may be calculated by picture units instead of block units.

Edge information of a video unit of a texture picture corresponding to the video unit of the prediction-target depth video unit is decided (step S220).

Edge information of a video unit of a texture picture corresponding to the video unit of the prediction-target video unit is decided.

For example, when the video unit of the prediction-target picture is a block unit, various block edge determining methods may be used to determine whether the corresponding texture picture includes edge information. For example, when the prediction-target video unit is a picture unit, a method of determining information of the number of edges present in a picture may be used.

When it is assumed that the video unit is a block, different video rendering quality calculating methods may be applied depending on whether a texture video unit corresponding to the prediction-target video unit includes an edge.

The rendering quality of a video is calculated on the basis of the difference value between the depth value of the warped predicted depth video unit and the depth value of the prediction-target depth video unit and the edge information (step 230).

The rendering quality of the prediction-target video unit may be calculated on the basis of the difference value between the depth information of the warped predicted depth video unit and the depth value of the prediction-target depth video unit, and the edge information of the video unit of the texture picture.

Expression 3 represents a texture mapping error $\Delta p'(x^p, y^p)$ calculated when it is assumed that a depth coding error of $\Delta L(x^p, y^p)$ occurs at the coordinates $(x^p, y^p)$ of a view video corresponding to the camera p.

$$\Delta p'(x^p, y^p) = \Delta L(x^p, y^p)\binom{k_x}{k_y} \quad \langle \text{Expression 3} \rangle$$

In Expression 3, $k_x$ and $k_y$ may be a function of a distance between camera view p and p', $Z_{near}$ and $Z_{far}$. $\Delta p'(x^p, y^p) \equiv (\hat{x}^{p'}, \hat{y}^{p'}) - (x^{p'}, y^{p'})$ may be defined, where ^ represents a coordinate when there is a depth coding error.

The rendering quality of a video may be calculated by Expressions 4 and 5 using the edge information of the texture video unit on the basis of the error calculating method of Expression 3.

Expressions 4 and 5 are expressions for calculating the rendering quality of a video on the basis of the depth information difference calculated using Expression 2 and the edge region information.

When the video unit is a video unit other than the block unit, the following expression may be modified, and this modified embodiment is also included in the scope of the present invention.

Expression 4 is an expression for calculating the rendering quality of a prediction-target video unit when the corresponding video unit of a texture picture does not include an edge region. Expression 5 is an expression for calculating the rendering quality of a prediction-target video unit when the corresponding video unit of a texture picture includes an edge region.

$$D^{\infty}_{rendered}(Q_{depth}) = K \cdot Q_{depth} \qquad \text{<Expression 4>}$$

Here, $Q_{depth}$ may be calculated using Expression 2 and K is a constant set depending on implementation.

$$D^2_{rendered}(Q_{depth}) = 2(1 - \rho_{area}^{C \cdot Q_{depth}}) \sigma_{area}^2 \qquad \text{<Expression 5>}$$

In Expression 5, $Q_{depth}$ may be calculated using Expression 2, $\rho_{area}^2$ represents a local correlation value of texture video pixels of a region to be coded, and $\sigma_{area}^2$ represents a variance value of texture video pixel values to a region to be coded. In addition, C is a constant determined depending on implementation.

It is determined whether the rendering quality of a video is smaller than a specific threshold value (step S240).

In step S240, it may be determined whether the rendering quality of a video is smaller than a specific threshold value using different threshold values depending on whether the corresponding texture video unit includes an edge region.

When it is determined in step S240 that the calculated rendering quality is smaller than the threshold value, it is determined that the coding efficiency can be enhanced without greatly sacrificing the video quality even by performing an encoding process using a skip mode, and it may be possible to encode the prediction-target video unit using a skip mode. When the determination result of step S240 is negative, another encoding method of encoding additional prediction information instead of the skip mode may be used.

When the corresponding texture video unit includes an edge region and when the corresponding texture video unit does not include an edge region, the threshold value used to determine whether to use a skip mode for encoding may have different values.

Information on whether to encode a specific video unit using a skip mode may be encoded on the basis of a syntax element. Table 1 shows a syntax indicating whether to perform an encoding process using a skip mode.

TABLE 1

```
macroblock( ){
    depth_skip_mode_flag
    if(!depth_skip_mode_flag){
        codec syntax~~
```

TABLE 1-continued

```
    }
}
```

Referring to Table 1, information on whether to perform encode a predetermined video unit (macro block) using a skip mode may be expressed as flag information using depth_skip_mode_flag which is a new syntax element.

The flag information title and the flag information value are arbitrary and may be changed, and this changed embodiment is included in the scope of the present invention.

The syntax element depth_skip_mode_flag is information indicating whether to use a skip mode for an encoding-target video unit. For example, when the flag value of the syntax element is 1, it means that the encoding-target video unit is encoded using a skip mode. Therefore, when the flag value of depth_skip_mode_flag is 1, the depth information of the warped predicted depth video unit may be used as the depth information of the prediction-target depth video unit. When the flag value is 0, the difference value between the depth value of the warped predicted depth video unit and the depth information of the prediction-target video unit and the additional information (such as reference picture information and motion vector information) may be encoded and transmitted.

The information on whether to use a skip mode for encoding may not be expressed by a specific syntax element as shown in Table 1 but may be a value derived through decoding or a value combined and encoded with other information. In the following embodiments of the present invention, it is assumed that the information on whether to use a skip mode and the index information to be additionally described later are encoded using a syntax element.

Figure 3:
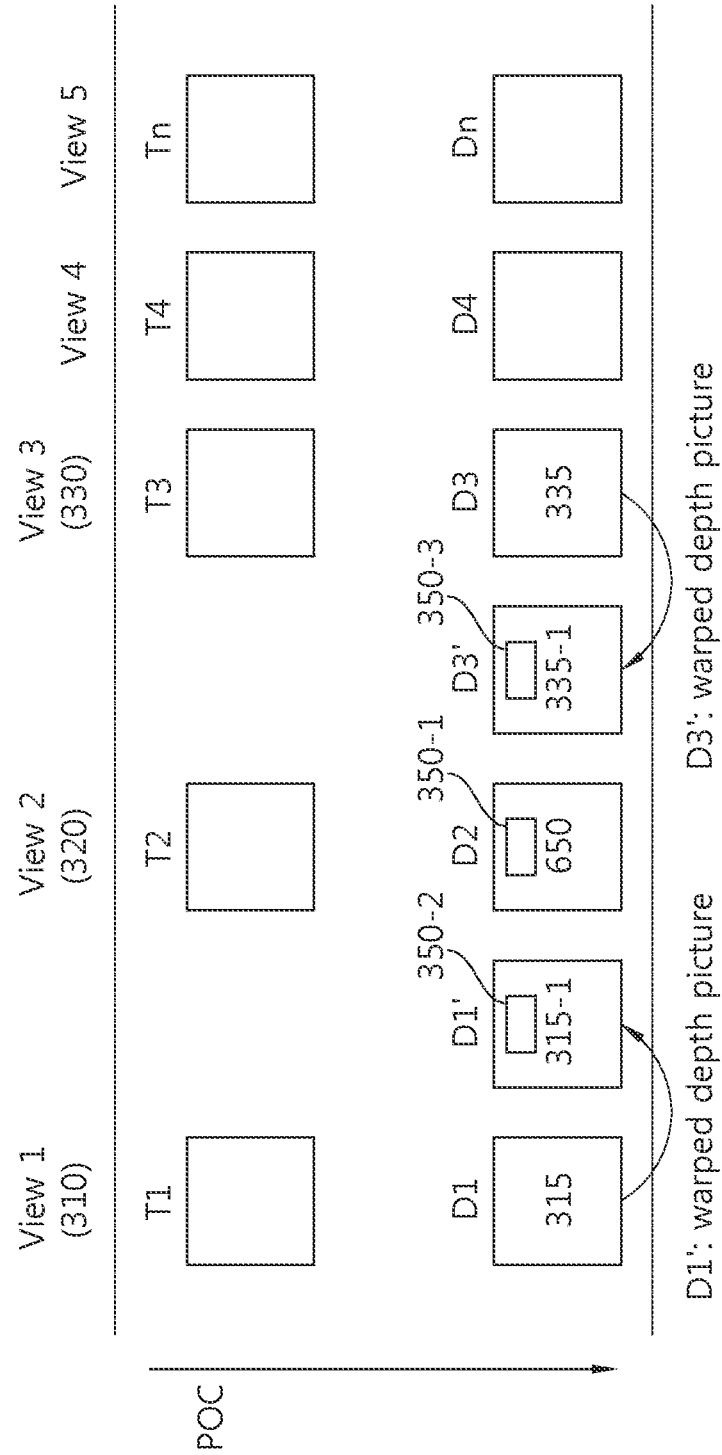
FIG. 3 is a conceptual diagram illustrating a VSP (View Synthesis Prediction) method with plural viewpoints according to an embodiment of the present invention.

FIG. 3 is a conceptual diagram illustrating a VSP (View Synthesis Prediction) method at plural viewpoints according to an embodiment of the present invention.

Referring to FIG. 3, n pictures (view 1 to view n) having the same POC and capable of being used as reference warped pictures may be present.

At least one depth picture of n depth pictures having the same POC may be warped with respect to the same view as a prediction-target depth picture to create warped predicted depth pictures 315-1 and 335-1. When plural warped predicted depth pictures 315-1 and 335-1 are present as a comparison picture for determining whether to use a skip mode for encoding, it may be determined whether to encode a prediction-target video unit 350-1 using a skip mode on the basis of the plural warped predicted depth pictures 315-1 and 335-1.

Even when three or more views are present as illustrated in FIG. 3, plural warped predicted depth pictures are not used and only one warped predicted depth picture 315-1 may be created as illustrated in FIG. 1.

For example, when n depth pictures of other views having the same POC and being encoded previous to the prediction-target depth picture are present in consideration of the coding order, the maximum n−1 warped predicted depth pictures may be created by performing the warping process with respect to the view of the prediction-target depth picture. The pictures of all the views may be warped with respect to the view of the current prediction-target depth picture. In the following embodiments of the present invention, it is assumed that only the depth video units of two different views view 1 310 and view 3 330 are used as the warped predicted depth pictures.

A warped predicted depth picture obtained by warping a depth picture present at the left view (view 1 310) of the current prediction-target depth picture may be defined as a first warped predicted depth picture 315-1, and a warped predicted depth picture obtained by warping a depth picture present at the right view (view 2 330) of the current prediction-target depth picture may be defined as a second warped predicted depth picture 335-1. The first warped predicted picture 315-1 and the second warped predicted depth picture 335-1 may be distinguished using index information.

Only one depth picture of the first warped predicted picture 315-1 and the second warped predicted depth picture 335-1 may be selected as a final warped predicted depth picture and it may be determined whether to use a skip mode for encoding as illustrated in FIG. 1. For example, as a method of selecting one depth picture of the first warped predicted picture 315-1 and the second warped predicted depth picture 335-1, residual values between the candidate warped predicted depth pictures 315-1 and 335-1 and the prediction-target depth picture 350 may be compared.

For another example, it may be determined whether to use a skip mode for encoding using both the first warped predicted picture 315-1 and the second warped predicted depth picture 335-1. When both of two warped predicted depth pictures 315-1 and 335-1 are used, the depth information of the video units 350-2 and 350-3 of the two warped predicted depth pictures 315-1 and 335-1 may be compared with the depth information of the video unit 350-1 of the prediction-target depth picture 350. On the basis of the comparison result, it may be determined whether to use a skip using the warped predicted depth video unit similar to the original information (the depth information of the prediction-target depth video unit. When this method is used, a different warped predicted depth video unit may be selected at the time of performing a skip mode for each prediction-target video unit.

Figure 4:
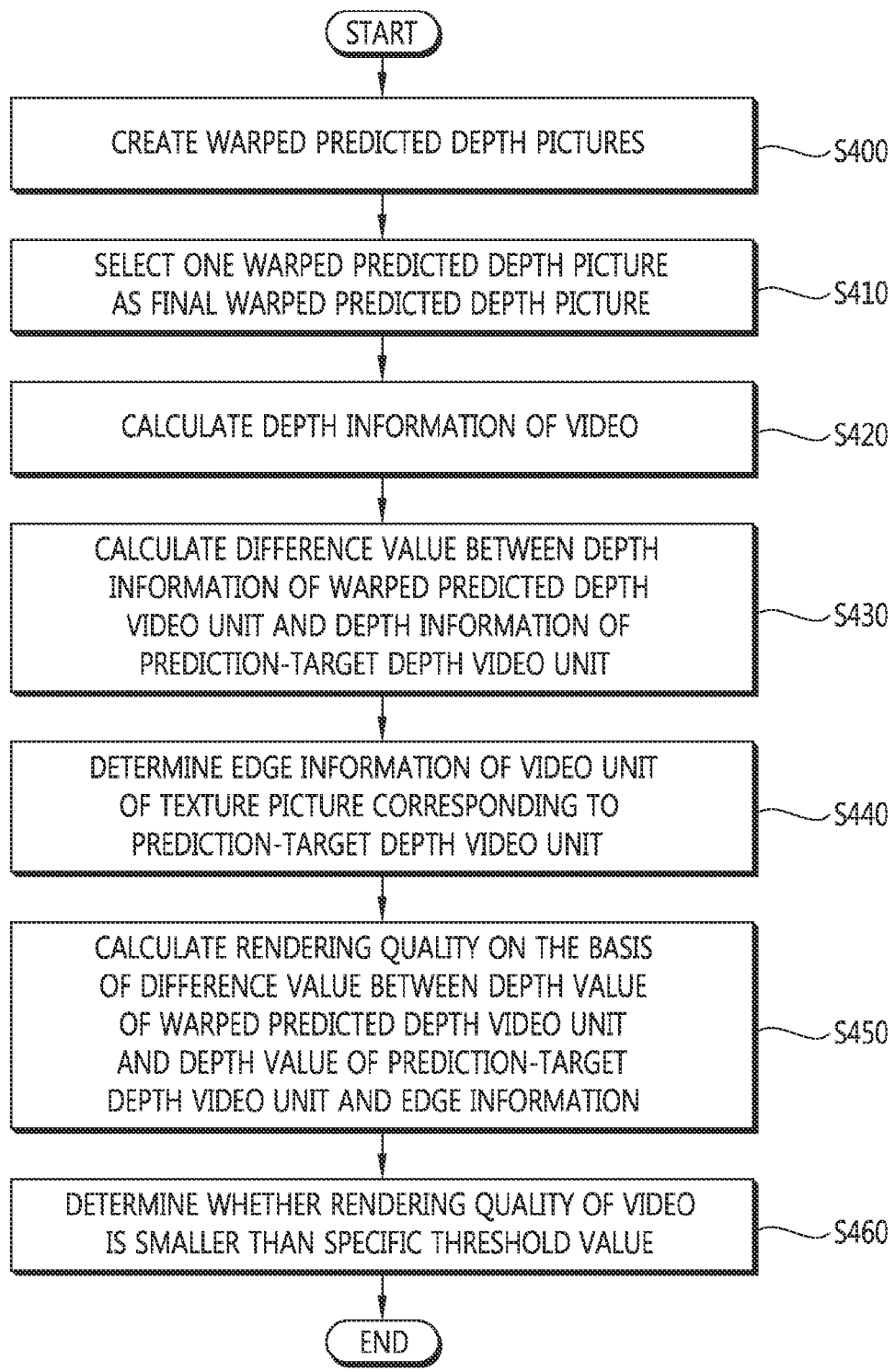
FIG. 4 is a flowchart illustrating a method of determining whether to encode a video unit using a skip mode when plural reference warped pictures are present according to an embodiment of the present invention.

FIG. 4 is a flowchart illustrating a method of determining whether to encode a video unit using a skip mode when plural reference warped pictures are present according to an embodiment of the present invention.

FIG. 4 illustrates a method of determining one warped predicted depth picture of plural warped predicted depth pictures as a final warped predicted depth picture and determining whether to using a skip mode for encoding.

The steps of the flowchart illustrated in FIG. 4 are not necessarily sequentially performed but may be performed in a changed order when the steps can be performed in the changed coding order.

Referring to FIG. 4, warped predicted depth pictures are created (step S400).

When n pictures having the same POC are present, plural warped predicted depth pictures warped with respect to the viewpoint of the prediction-target depth picture may be created. For example, two warped predicted depth picture may be created using pictures present at viewpoints close to the viewpoint of the prediction-target depth picture.

One warped predicted depth picture is selected as the final warped predicted depth picture (step S410).

When plural warped predicted depth pictures are created in step S400, one warped predicted depth picture may be selected as the final warped predicted depth picture and may be used to determine whether encode a video unit of the prediction-target picture using a skip mode.

After one warped predicted depth picture is selected as the final warped predicted depth picture, the process flow (steps S420 to S460) of determining whether to use a skip mode for encoding may include a process flow of determining whether to use a skip mode for encoding with respect to one warped predicted depth picture similarly to the process flow of steps S200 to S240.

Figure 5:
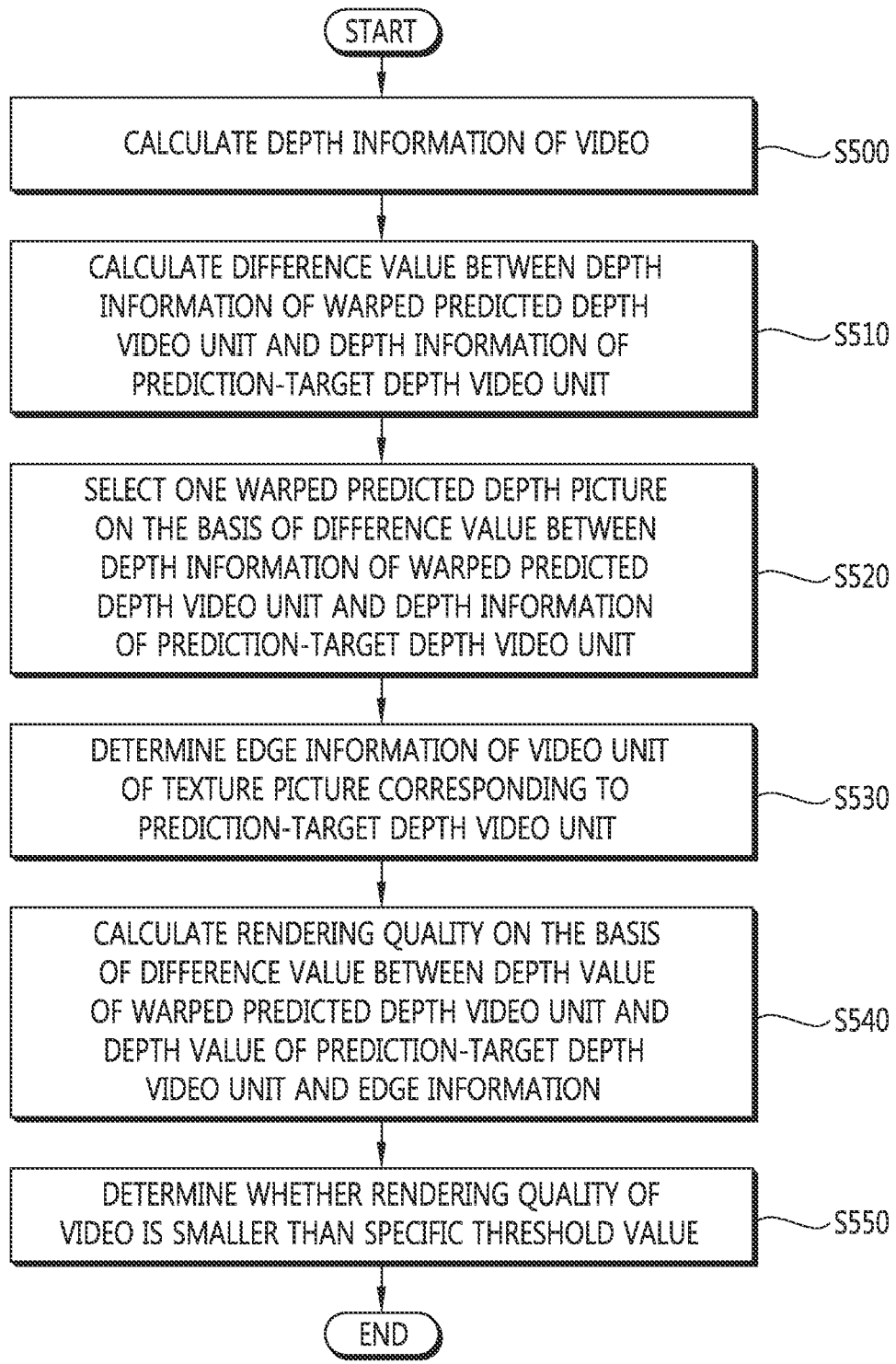
FIG. 5 is a flowchart illustrating a method of determining whether to encode a video unit using a skip mode when two warped predicted depth pictures are used for encoding using a skip mode.

When both of two warped predicted depth pictures are used for encoding using a skip mode, whether to encode a video unit using a skip mode may be determined using the process flow illustrated in FIG. 5 without performing the step of determining one picture of two warped predicted depth pictures.

FIG. 5 is a flowchart illustrating a method of determining whether to encode a video unit using a skip mode when two warped predicted depth pictures are used for encoding using a skip mode.

The steps of the flowchart illustrated in FIG. 5 are not necessarily sequentially performed but may be performed in a changed order when the steps can be performed in the changed coding order.

Depth information of a video is calculated (step S500).

The same method as used in step S200 may be used to calculate the depth information of a video.

A difference value between the depth information of a warped predicted depth video unit and the depth information of the prediction-target depth video unit is calculated (step S510).

Difference values between depth information of plural warped predicted depth video units and the depth information of the prediction-target depth video unit may be calculated. For example, when two pictures are used as the warped predicted depth pictures, the difference between the depth information of the first warped predicted depth video unit and the depth information of the prediction-target depth video unit may be calculated and the difference value between the second warped predicted depth video unit and the depth information of the prediction-target depth video unit may be calculated.

The same method as used in step S210 of FIG. 2 may be used as a method of calculating the difference value.

One warped predicted depth video unit is selected on the basis of the difference values between the warped predicted depth video units and the depth information of the prediction-target depth video unit (step S520).

On the basis of the difference values between the warped predicted depth video units and the depth information of the prediction-target depth video unit, the warped predicted depth video unit having the smaller difference value may be selected as a warped predicted depth video unit for determining whether to use a skip mode for encoding.

Steps S530 to S550 after one warped predicted depth video unit is selected may be performed in the same way as described in steps subsequent to step S220 of FIG. 2.

The information on whether to use a skip mode for encoding may be encoded and the syntax element depth_skip_mode_flag which is information indicating whether to use a skip mode to encode a video unit may be transmitted. When a selected picture to be encoded using a skip mode is additionally used as illustrated in FIGS. 3 to 5, information on which picture is used for prediction using a skip mode may be additionally encoded and transmitted by transmitting index information of plural warped predicted depth pictures.

According to an embodiment of the present invention, another reference picture (for example, a previous depth picture or a subsequent depth picture having the same POC) as well as the warped predicted depth video unit may be used to predict the prediction-target video unit. In the following embodiments of the present invention, a picture used to predict a prediction-target video unit is defined as a reference picture. The reference picture may include a warped reference picture which is a reference picture subjected to a warping process and a non-warped reference picture which is a reference picture not subjected to a warping process.

Figure 6:
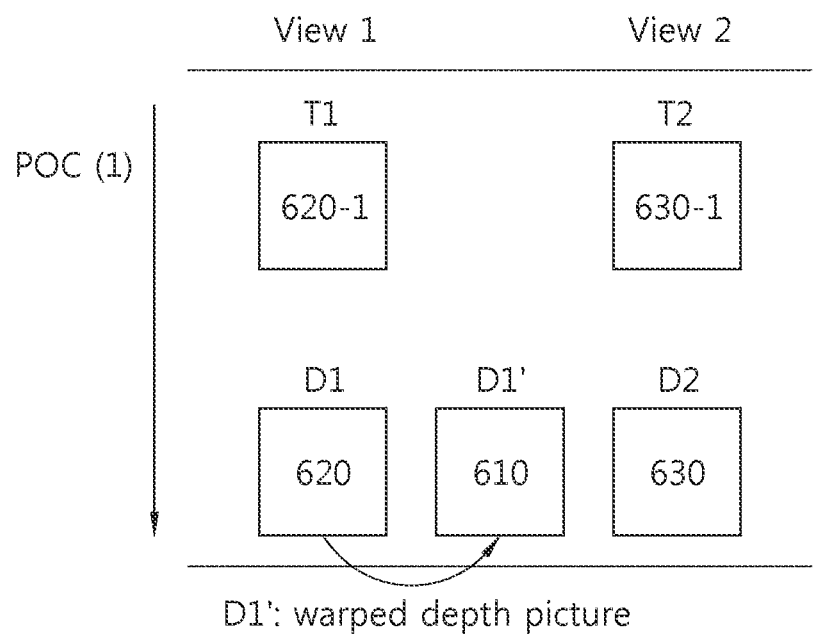
FIG. 6 is a conceptual diagram illustrating a VSP (View Synthesis Prediction) method according to an embodiment of the present invention.
Figure 6:
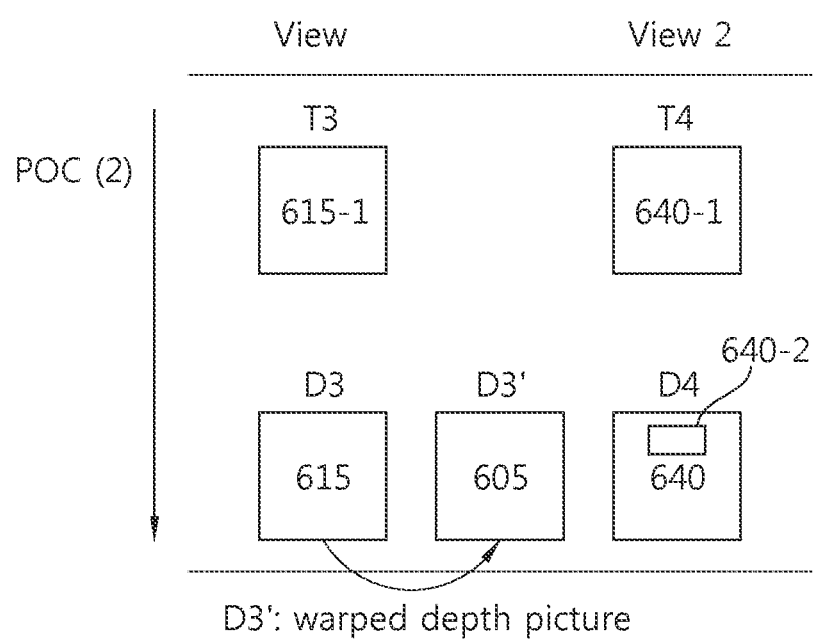

FIG. 6 is a conceptual diagram illustrating a VSP (View Synthesis Prediction) method according to an embodiment of the present invention.

A reference picture having a different POC value and not subjected to a warping process as well as the warped predicted depth picture may be used to determine whether to use a skip mode for encoding.

Referring to FIG. 6, plural reference pictures may be used to predict a depth value of a prediction-target video unit.

It is assumed that a T1 picture 620-1, a D1 picture 620, a T2 picture 630-1, and a D2 picture 630 are pictures which are earlier encoded and decoded than a T3 picture 615-1, a D3 picture 615, a T4 picture 640-1, and a D4 picture 640 and which are used as reference pictures for predicting the T3 picture 615-1, the D3 picture 615, the T4 picture 640-1, and the D4 picture 640

A reference picture may be used to have a concept including warped predicted depth pictures 605 and 610 and non-warped predicted depth pictures 615, 620, and 630. The warped predicted depth pictures 605 and 610 are pictures for creating the predicted depth information value of a prediction-target depth picture created by performing a warping process, and the non-warped predicted depth pictures 615, 620, and 630 are pictures used to predict the depth information of the prediction-target video unit without performing a warping process. For example, the non-warped predicted depth pictures 615, 620, and 630 may include a depth picture 630 having the same view as the prediction-target depth picture 640 and having a different POC value therefrom, a depth picture 620 having a view different from the prediction-target depth picture 640 and having a different POC value therefrom, and a depth picture 615 having a view different from the prediction-target depth picture 640 and having the same POC value.

The warped predicted depth pictures 605 and 610 may include a warped predicted depth picture obtained by warping a depth picture 615 having a view different from the prediction-target depth picture 640 and having the same POC value as the prediction-target depth picture 640 and a warped predicted depth picture 610 obtained by warping a depth picture 620 having a different POC value.

When plural reference pictures are present, the non-warped predicted depth pictures 615, 620, and 630 and the warped predicted depth pictures 605 and 610 may be indexed to create a reference picture list. For example, indices may be first given to the warped predicted depth pictures 605 and 610 and then indices may be given to the non-warped predicted depth pictures 615, 620, and 630. A small index value may be given to the depth picture present at a viewpoint close to the viewpoint of the prediction-target depth picture out of the warped predicted depth pictures 605 and 610, the depth pictures having the same viewpoint out of the non-warped predicted depth pictures 615, 620, and 630 may be indexed, and then an index value may be given to a reference picture having a small POC difference. Various methods may be used to construct a reference picture list.

As illustrated in FIGS. 1 and 2, when the reference picture used to determine whether to use a skip mode for encoding is one warped predicted depth picture, only the information on whether to perform a skip mode may be encoded without separately indexing the reference picture used to determine whether to use a skip mode for performing an encoding process using a skip mode.

However, when the number of reference pictures used to determine whether to use a skip mode for encoding is two or more, index information of the reference picture used to determine whether to use a skip mode for encoding at the time of performing an encoding process using a skip mode may be additionally encoded in addition to the information on whether to perform a skip mode.

That is, when various pictures such as the warped predicted depth pictures 605 and 610 and the non-warped predicted depth pictures 615, 620, and 630 are additionally used to determine whether to use a skip mode for encoding, index information which is obtained by indexing the information on the reference pictures used to determine whether to use a skip mode for encoding at the time of performing an encoding process using a skip mode may be encoded in addition to the information on whether to perform a skip mode.

Referring to FIG. 6 again, for example, it is assumed that one warped predicted depth picture 605 and three non-warped predicted depth pictures (a first reference picture 630, a second reference picture 615, and a third reference picture 620) are present in the reference picture list used for reference pictures for predicting a prediction-target video unit 640-2.

Here, as index information of the reference pictures included in the reference picture list, index 0 may be allocated to the warped predicted depth picture 605, index 1 may be allocated to the first reference picture 630, index 2 may be allocated to the second reference picture 615, and index 3 may be allocated to the third reference picture 620.

The encoder may compare residual values between the prediction-target video unit and the video units of plural reference pictures such as the warped predicted depth picture 605, the first reference picture 630, the second preference picture 615, and the third reference picture 620. It may be determined whether to encode the prediction-target video unit using a skip mode on the basis of the reference picture having the smallest residual value as the comparison result.

For example, when the residual value between the prediction-target block and a corresponding block included in the first reference picture 630 is the smallest as the comparison result in residual values, it may be determined whether to use a skip mode for encoding in the same process flow as illustrated in FIG. 2 using the corresponding block included in the first reference picture 630.

The information on whether to perform an encoding process using a skip mode may be encoded on the basis of the flag information such as the above-mentioned syntax element depth_skip_mode_flag and the information of the used reference picture may be encoded on the basis of additional index information.

When a skip mode is not performed, additional prediction information such as reference picture list information, reference picture information, motion vector information, and residual information may be encoded and transmitted to the decoder, similarly to an existing method of encoding a prediction-target block.

Figure 7:
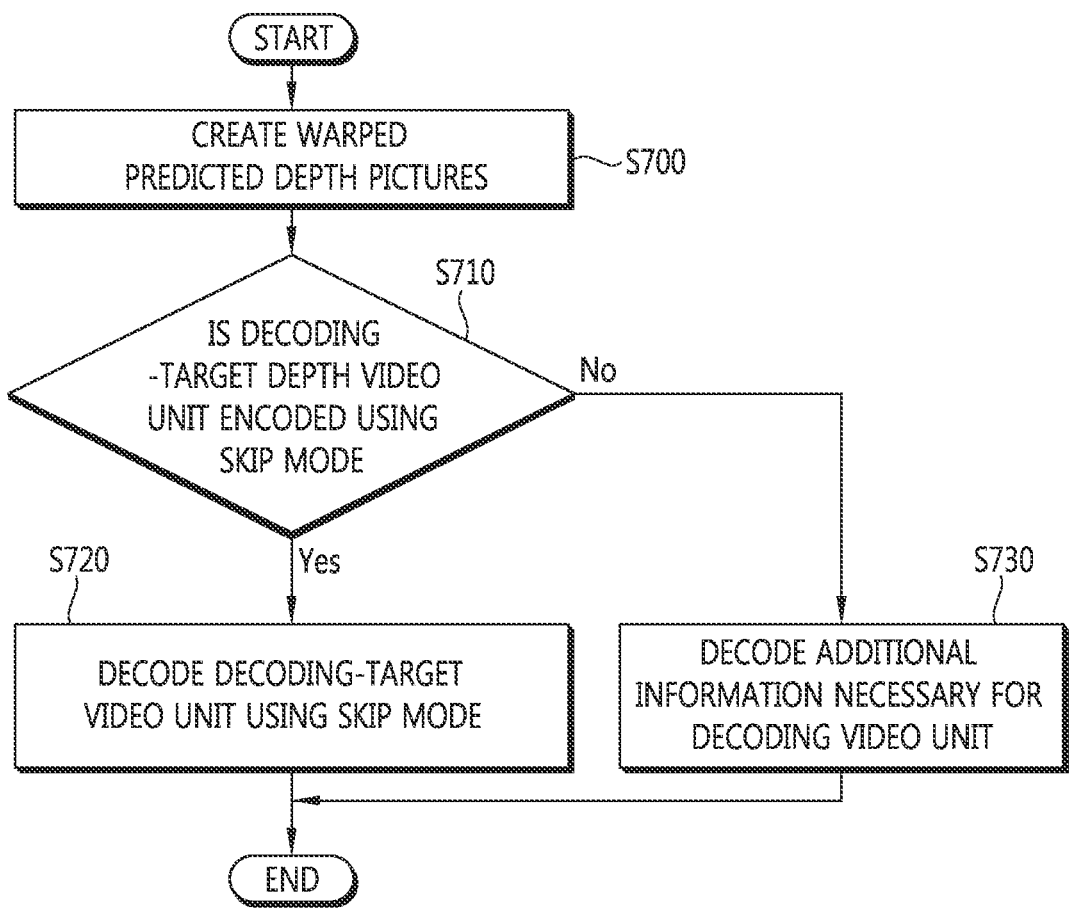
FIG. 7 is a flowchart illustrating a video decoding method according to an embodiment of the present invention.

FIG. 7 is a flowchart illustrating a video decoding method according to an embodiment of the present invention.

FIG. 7 illustrates an encoding method using the method of determining whether to encode one warped predicted depth video unit using a skip mode, which is illustrated in FIGS. 1 and 2. The steps of the flowchart illustrated in FIG. 7 are not necessarily sequentially performed but may be performed in a changed order when the steps can be performed in the changed coding order.

Referring to FIG. 7, a warped predicted depth picture is created (step S700).

When the warped predicted depth picture is used for only encoding using a skip mode, the skip mode encoding information may be first decoded and then the warped predicted depth picture may be created. That is, step S700 may be performed after step S710 to be described below.

Since whether to create the warped predicted depth picture may be determined depending on when to skip a decoding-target video unit, but a decoding method (for example, a merging mode or an AMVP) other than the skip mode may be used to decode a video unit, the warped predicted depth picture may be stored in the reference picture list at the time of decoding the prediction-target depth picture.

By decoding the skip information, it is determined whether to use a skip mode for encoding (step S710).

The skip information is a flag indicating whether to perform a skip mode such as depth_skip_mode_flag and is information on whether to use a skip mode to encode the decoding-target video unit.

For example, the information on whether to use a skip mode to encode a video unit may be obtained by inference without decoding the skip information or the information on whether to use a skip mode to encode a video unit may be obtained on the basis of information obtained by combining and encoding the skip information with another syntax element information.

When a video unit is encoded using a skip mode, the decoding-target video unit is decoded using the skip mode (step S720).

When a decoding process is performed using the skip mode, the depth information of the warped predicted depth video unit may be directly used as the depth information of the decoding-target video unit.

When a video unit is encoded without using a skip mode, additional information necessary for decoding the video unit is decoded (step S730).

When a video unit is encoded without using a skip mode, additional information (for example, reference picture information, motion vector information, and residual information) necessary for decoding the video unit is decoded.

Figure 8:
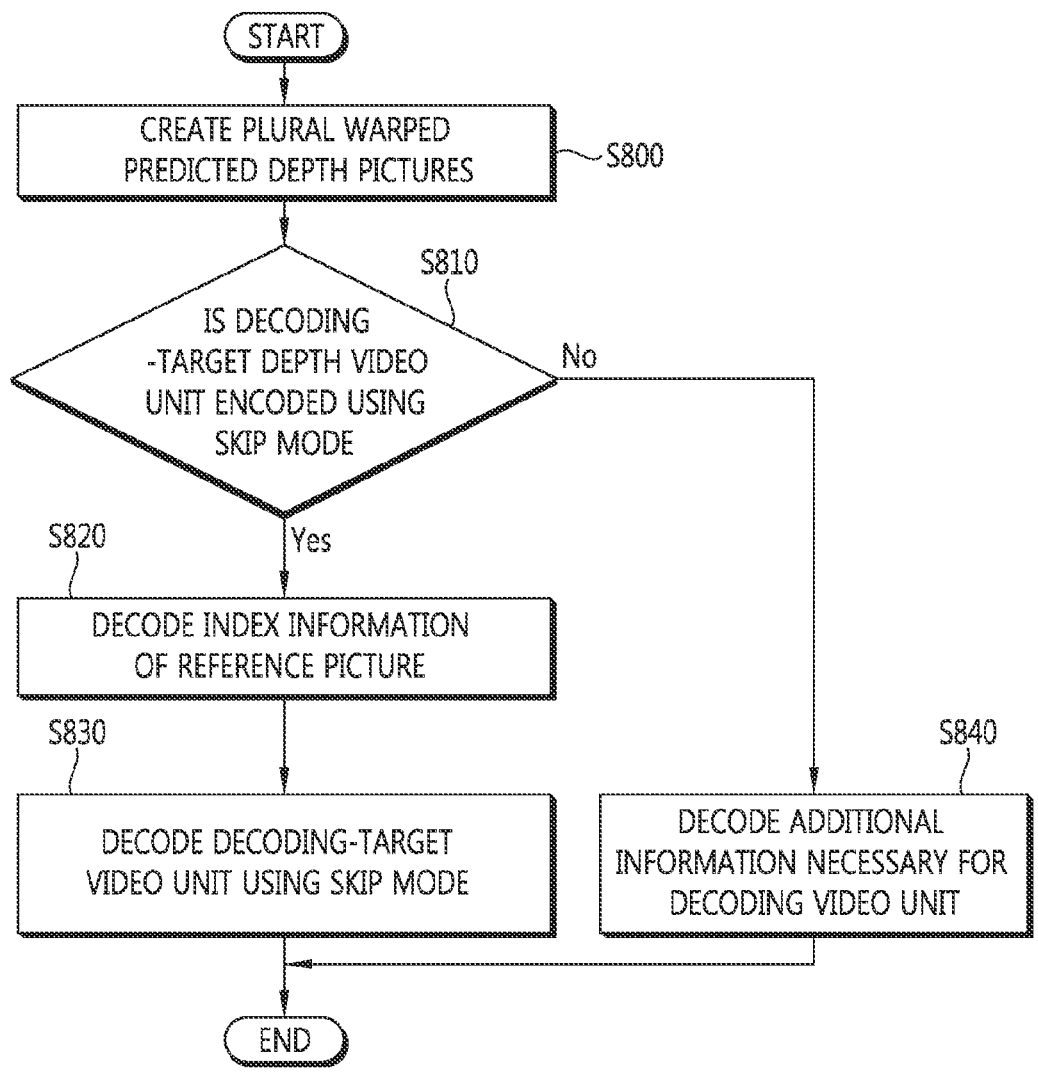
FIG. 8 is a flowchart illustrating a video decoding method according to an embodiment of the present invention.

FIG. 8 is a flowchart illustrating a video decoding method according to an embodiment of the present invention.

FIG. 8 illustrates a decoding method on the basis of the encoding method illustrated in FIGS. 3 to 5. The steps of the flowchart illustrated in FIG. 8 are not necessarily sequentially performed but may be performed in a changed order when the steps can be performed in the changed coding order.

Referring to FIG. 8, plural warped predicted depth pictures are created (step S800).

When a picture used to perform a skip mode is plural warped predicted depth pictures, plural warped predicted depth pictures may be created by performing a warping process. The created warped predicted depth pictures may be stored in a buffer such as a reference picture list.

Skip information is decoded (step S810).

The skip information is a flag indicating whether to perform a skip mode such as depth_skip_mode_flag and is information on whether to use a skip mode to encode the decoding-target video unit.

For example, the information on whether to use a skip mode to encode a video unit may be obtained by inference without decoding the skip information or the information on whether to use a skip mode to encode a video unit may be obtained on the basis of information obtained by combining and encoding the skip information with another syntax element information.

Reference picture index information is decoded (step S820).

When a decoding process is performed using the skip mode, the reference picture index information used for the decoding-target video unit may be decoded to obtain information on what warped predicted depth picture out of plural warped predicted depth pictures to use to perform a decoding process using the skip mode. When two warped predicted depth video units are used as described above, index information on what video unit is used for the skip mode may be encoded and such index information may be decoded and used for the decoding process using the skip mode.

The decoding-target video unit is decoded using the skip mode (step S830).

The decoding process using the skip mode may be performed using the warped predicted depth video unit selected in step S820.

When it is determined in step S810 that the skip mode is not used, additional information necessary for decoding a video unit is decoded (step S840).

When the video unit is encoded without using the skip mode, additional information (for example, reference picture information, motion vector information, and residual value information) necessary for decoding the video unit is decoded.

Figure 9:
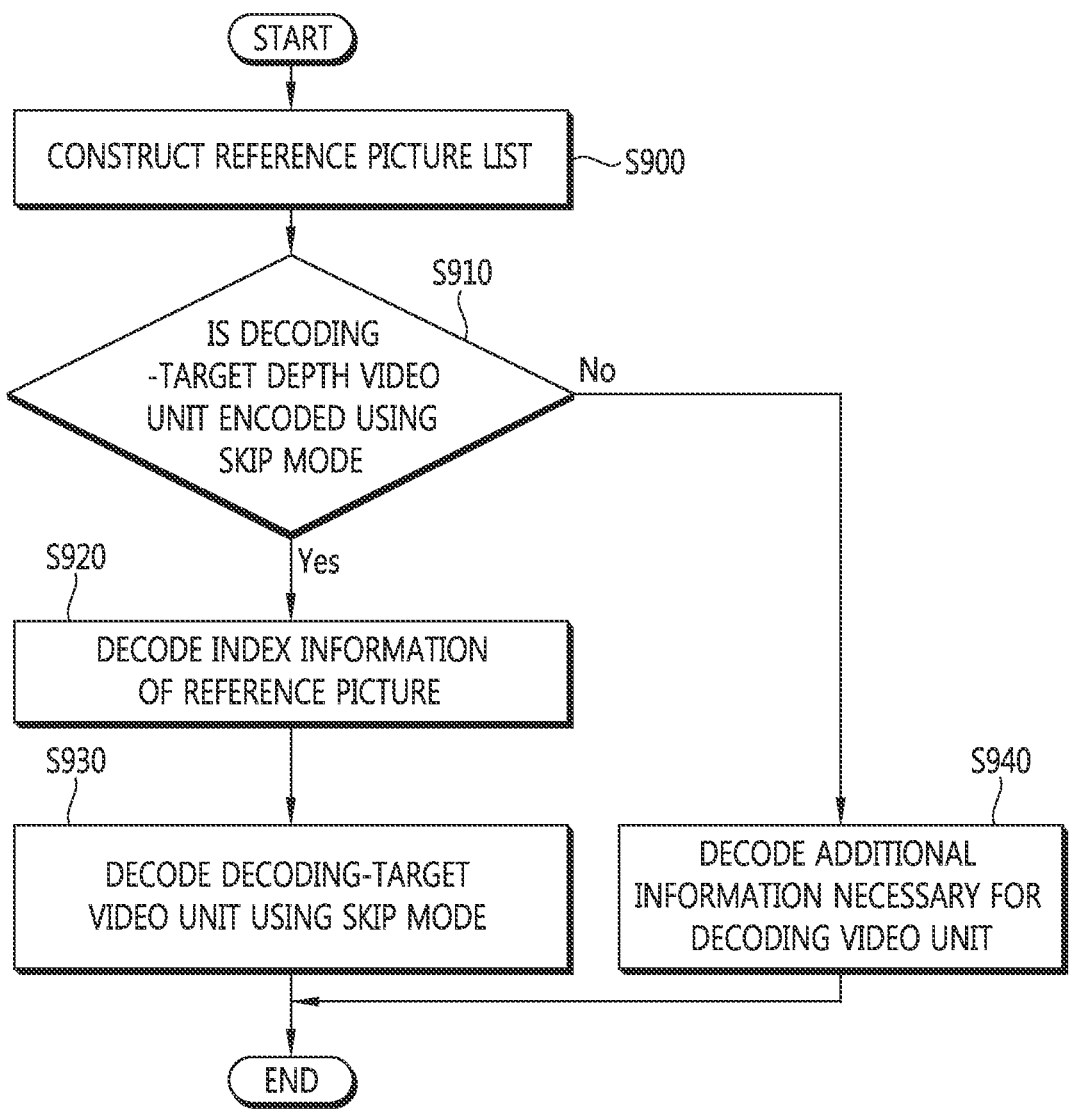
FIG. 9 is a flowchart illustrating a video decoding method according to an embodiment of the present invention.

FIG. 9 is a flowchart illustrating a video decoding method according to an embodiment of the present invention.

FIG. 9 illustrates a decoding method based on the encoding method illustrated in FIG. 5. The steps of the flowchart illustrated in FIG. 9 are not necessarily sequentially performed but may be performed in a changed order when the steps can be performed in the changed coding order.

Referring to FIG. 9, a reference picture list is constructed (step S900).

The reference picture list used to perform a skip mode may include at least one warped predicted depth picture or non-warped predicted depth picture. Various methods may be used as a method of indexing the warped predicted depth picture or non-warped predicted depth picture.

The skip information is decoded (step S910).

The skip information is a flag indicating whether to perform a skip mode such as depth_skip_mode_flag and is information on whether to use a skip mode to encode the decoding-target video unit.

For example, the information on whether to use a skip mode to encode a video unit may be obtained by inference without decoding the skip information or the information on whether to use a skip mode to encode a video unit may be obtained on the basis of information obtained by combining and encoding the skip information with another syntax element information.

Reference picture index information for the decoding-target video unit is decoded (step S920).

When a decoding process is performed using the skip mode, the index information of the reference picture may be decoded to obtain information on what reference picture out of plural reference pictures to use to perform the decoding process using the skip mode.

The decoding-target video unit is decoded using the skip mode (step S930).

The decoding process using the skip mode may be performed using the warped predicted depth video unit selected in step S920.

When it is determined in step S910 that the skip mode is not used, additional information necessary for decoding a video unit is decoded (step S940).

When the video unit is encoded without using the skip mode, additional information (for example, reference picture information, motion vector information, and residual value information) necessary for decoding the video unit is decoded.

Figure 10:
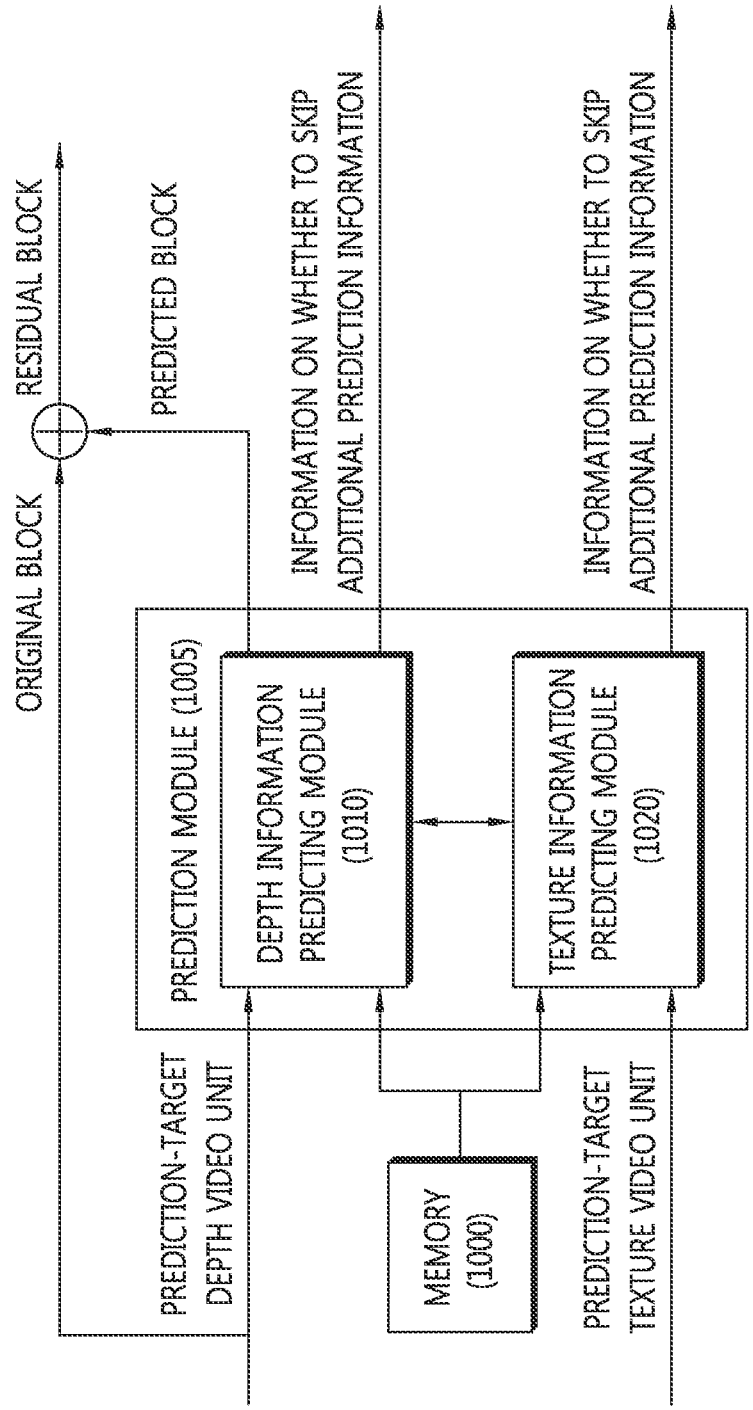
FIG. 10 is a conceptual diagram illustrating a part of a video encoder according to an embodiment of the present invention.

FIG. 10 is a conceptual diagram illustrating a part of a video encoder according to an embodiment of the present invention.

Referring to FIG. 10, the video encoder may include a memory 1000 and a prediction module 1005, and the prediction module 1005 may include a depth information predicting module 1010 and a texture information predicting module 1020.

Depth pictures and texture pictures which are previously encoded may be stored in the memory 1000. The encoded depth pictures and texture pictures stored in the memory 1000 may be used for the prediction module 1005 to predict a depth picture and a texture picture.

The texture information predicting module 1020 may predict texture information such as luma information and chroma information of a multi-view video. Various prediction methods such as an intra prediction method and an inter prediction method may be used as the method of predicting texture information.

The depth information predicting module 1010 may predict depth information of a video. As described above, the depth information predicting module 1010 may use video information of another picture using a skip mode without encoding the prediction information. The depth information predicting module 1010 may create a warped predicted depth picture by warping a depth picture stored in the memory and may determine whether to perform a skip mode on the basis of one warped predicted depth picture or plural warped predicted depth pictures.

When the depth information predicting module 101 performs an encoding process using a skip mode, information indicating that a prediction-target video unit is encoded using a skip mode may be encoded and transmitted to the decoder without encoding and transmitting residual information (a difference between the predicted depth information and the original depth information) and thus a video decoder may perform a decoding process using the skip mode. When plural warped predicted depth pictures or plural reference pictures are used, index information of pictures used for the skip mode may be additionally encoded and transmitted.

When the depth information predicting module 101 does not perform an encoding process using the skip mode, the residual information may be additionally encoded, the additional prediction information (such as motion vector information and reference picture index information) used for the prediction may be encoded, and the resultant information may be transmitted to the video decoder.

The depth information predicting module 101 may include the following additional elements so as to determine whether to encode a prediction-target video unit using the skip mode.

Figure 11:
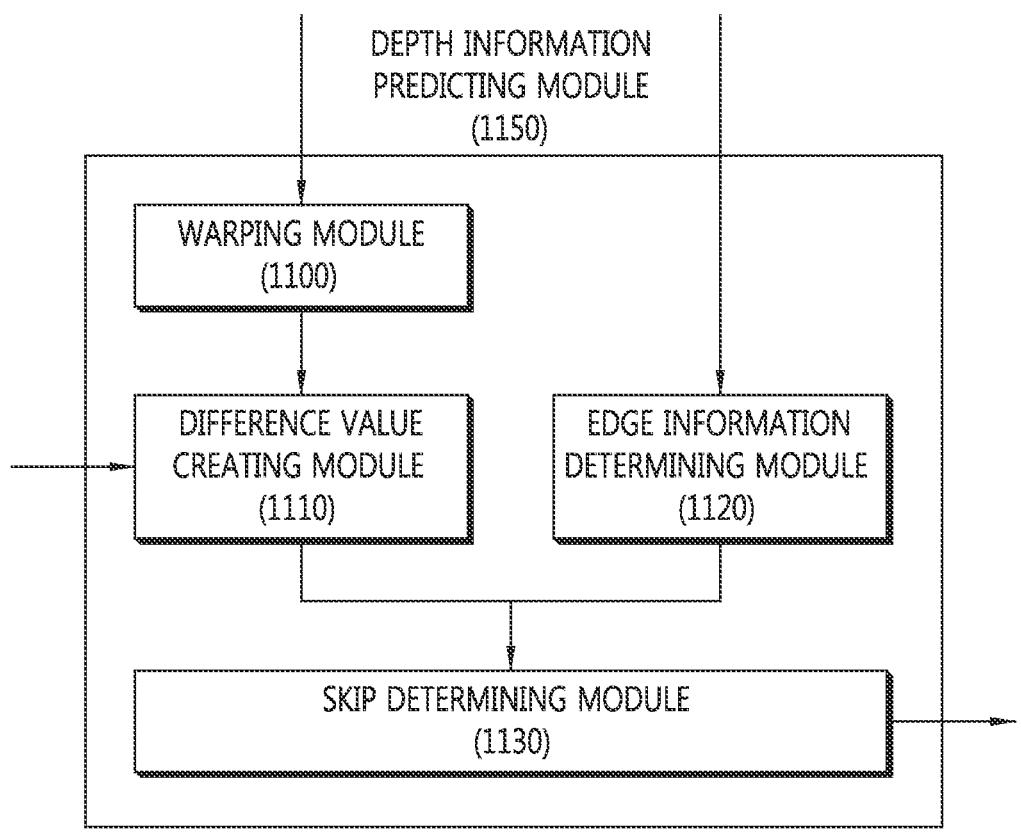
FIG. 11 is a conceptual diagram illustrating a depth information predicting module according to an embodiment of the present invention.

FIG. 11 is a conceptual diagram illustrating the depth information predicting module according to an embodiment of the present invention.

Referring to FIG. 11, the depth information predicting module 1150 may include a warping module 1100, a difference value creating module 1110, an edge information determining module 1120, and a skip determining module 1130.

The warping module 1100 may perform a warping process at the viewpoint of the prediction-target picture by warping an encoded depth picture supplied from the memory. The warping module 1100 may create a warped predicted depth picture for determining whether to perform a video unit of a prediction-target picture using the skip mode.

The difference value creating module 1110 may calculate a depth information difference value between a video unit of a prediction-target depth picture and a video unit of a warped predicted depth picture corresponding to the video unit of the prediction-target depth picture. The difference value created by the difference value creating module 1110 may be input to the skip determining module 1130 and it may be determined whether to encode the video unit of the prediction-target depth picture using the skip mode therein.

The edge information determining module 1120 may determine edge information of a video unit of a texture picture corresponding to the video unit of the prediction-target depth picture. For example, when the edge information determining module 1120 determines that an edge is present in the video unit of the texture picture, the corresponding information may be input to the skip determining module 1130 and may be used as information for determining whether to use the skip mode for encoding.

Figure 12:
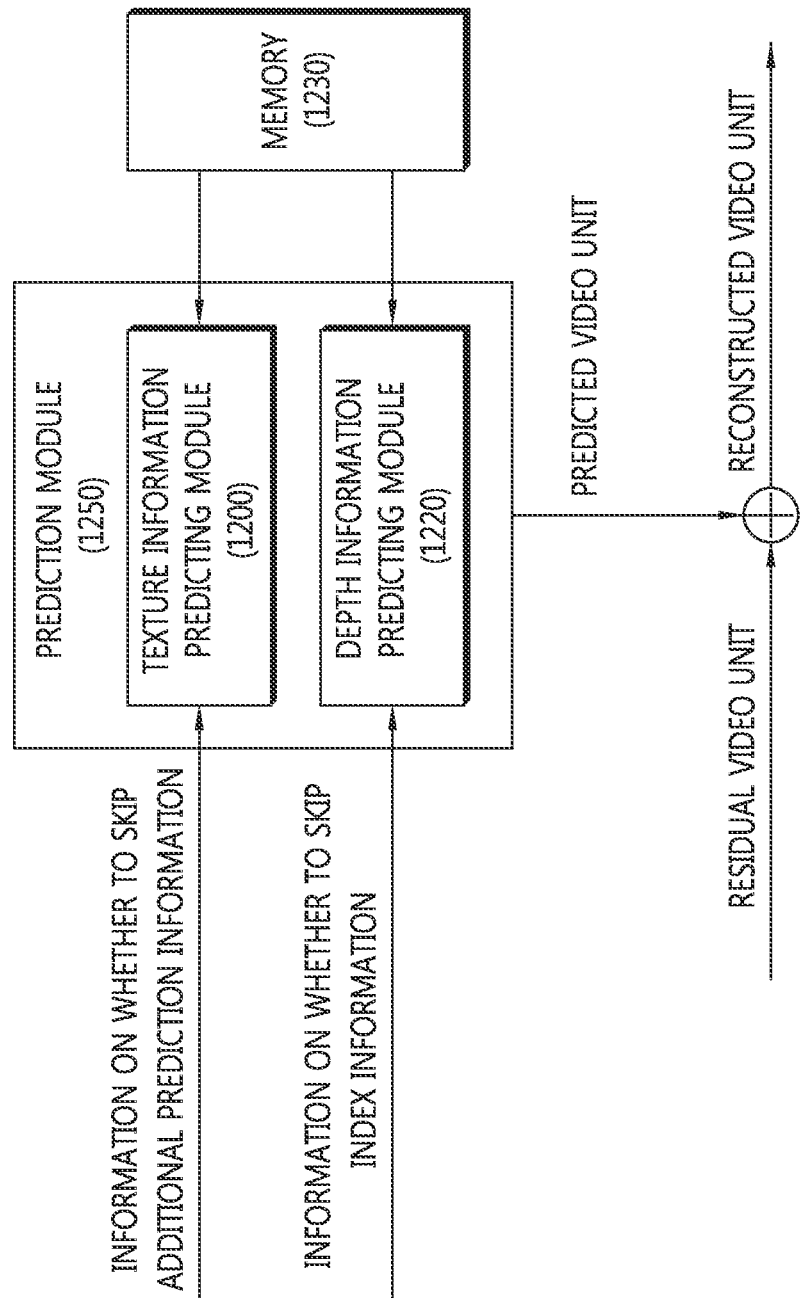
FIG. 12 is a conceptual diagram illustrating a part of a video decoder according to an embodiment of the present invention.

FIG. 12 is conceptual diagram illustrating a part of a video decoder according to an embodiment of the present invention.

Referring to FIG. 12, the video decoder may include a prediction module 1250 and a memory 1230, and the prediction module 1250 may include a depth information predicting module 1220 and a texture information predicting module 1200.

Depth pictures and texture pictures which are previously decoded may be stored in the memory 1230. The decoded depth pictures and texture pictures stored in the memory 1230 may be used for the prediction module 1230 to predict a depth picture and a texture picture.

The texture information predicting module 1200 may create predicted values of texture information such as luma information and chroma information of a multi-view video on the basis of the prediction information transmitted from the video encoder.

The depth information predicting module 1220 may predict the depth information of the video on the basis of the information transmitted from the video encoder. When information indicating that the skip mode is used is transmitted from the video encoder, the depth information predicting module 1220 may receive a reference picture from the memory and may use the depth information of a warped predicted depth picture created by warping the reference picture as the depth information of a prediction-target picture.

When plural warped predicted depth pictures or plural reference pictures are used to perform a decoding process using the skip mode, index information of a picture used for the skip mode may be additionally decoded to perform a decoding process using the skip mode. The video unit subjected to the decoding process using the skip mode may be decoded without using additional residual information.

When the encoder performs a prediction process using a prediction method other than the skip mode, the depth information predicting module 1220 may add the predicted values and the decoded residual information of the video unit and may output the added information.

While the present invention is described above with reference to embodiments, it will be understood by those skilled in the art that the present invention can be modified and changed in various forms without departing from the spirit and scope of the invention described in the appended claims.

The invention claimed is:

1. A video decoding method, performed by a decoding apparatus, comprising the steps of:
    creating a warped predicted depth video unit;
    decoding skip information of a decoding-target video unit in a depth picture; and
    decoding the decoding-target video unit in the depth picture using a skip mode on the basis of the skip information,
    wherein the skip information is information determined on the basis of depth information of the warped predicted depth video unit, depth information of the decoding-target video unit, and edge information of a video unit of a texture picture corresponding to the decoding-target video unit,
    wherein the skip information is information which is calculated on the basis of the steps of:
        calculating a maximum depth difference value which is a maximum value of difference values between a depth value of the decoding-target video unit and a converted depth value of the warped predicted depth video unit; and
        determining whether an edge region is present in the video unit of a texture picture corresponding to the prediction-target depth video unit,
    wherein the skip information is information which is determined by at least one of the steps of:
        determining whether a value calculated using a first video rendering quality calculating method is greater than a first threshold value on the basis of the maximum depth difference value when an edge is present; and
        determining whether a value calculated using a second video rendering quality calculating method is greater than a second threshold value on the basis of the maximum depth difference value when an edge is not present.

2. The video decoding method according to claim 1, wherein the warping predicted depth video unit is a picture which is obtained by warping a depth picture having the same POC (Picture Order Count) as a prediction-target depth picture at a viewpoint of the prediction-target depth picture.

3. A video decoding method comprising the steps of:
    creating a plurality of warped predicted depth video units and decoding skip information of a decoding-target video unit and index information of the warped predicted depth video unit to be used to perform a skip mode; and
    decoding the decoding-target video unit using a skip mode on the basis of the skip information and the index information,
    wherein the skip information is information determined on the basis of depth information of the warped predicted depth video unit, depth information of the decoding-target video unit, and edge information of a video unit of a texture picture corresponding to the decoding-target video unit,
    wherein the skip information is information which is calculated on the basis of the steps of:
        calculating a maximum depth difference value which is a maximum value of difference values between a depth value of the decoding-target video unit and a converted depth value of the warped predicted depth video unit; and
        determining whether an edge region is present in the video unit of a texture picture corresponding to the prediction-target depth video unit,
    wherein the skip information is information which is determined by at least one of the steps of:
        determining whether a value calculated using a first video rendering quality calculating method is greater than a first threshold value on the basis of the maximum depth difference value when an edge is present; and
        determining whether a value calculated using a second video rendering quality calculating method is greater than a second threshold value on the basis of the maximum depth difference value when an edge is not present.

4. The video decoding method according to claim 3, wherein the index information of the warped predicted depth video unit is index information of the warped predicted depth picture having a small difference from depth information of the decoding-target video unit out of the plurality of warped predicted depth video units.

5. A video decoding method comprising the steps of:
    creating reference pictures and decoding skip information of a decoding-target video unit and index information of the reference picture to be used to perform a skip mode; and
    decoding the decoding-target video unit using a skip mode on the basis of the skip information,
    wherein the skip information is information determined on the basis of depth information of the warped predicted depth video unit, depth information of the decoding-target video unit, and edge information of a video unit of a texture picture corresponding to the decoding-target video unit,
    wherein the skip information is information which is calculated on the basis of the steps of:
        calculating a maximum depth difference value which is a maximum value of difference values between a depth value of the decoding-target video unit and a converted depth value of the warped predicted depth video unit; and
        determining whether an edge region is present in the video unit of a texture picture corresponding to the prediction-target depth video unit,
    wherein the skip information is information which is determined by at least one of the steps of:
        determining whether a value calculated using a first video rendering quality calculating method is greater than a first threshold value on the basis of the maximum depth difference value when an edge is present; and
        determining whether a value calculated using a second video rendering quality calculating method is greater than a second threshold value on the basis of the maximum depth difference value when an edge is not present.

6. The video decoding method according to claim 5, wherein the reference pictures include a warped predicted depth picture which is a reference picture subjected to warping and a non-warped predicted depth picture which is a reference picture not subjected to warping.

7. A video decoder comprising:
an entropy decoding module that decodes skip information of a decoding-target video unit; and
a prediction module that creates a warped predicted depth video unit and decodes the decoding-target video unit using a skip mode on the basis of the skip information,
wherein the skip information is information determined on the basis of depth information of the warped predicted depth video unit, depth information of the decoding-target video unit, and edge information of a video unit of a texture picture corresponding to the decoding-target video unit,
wherein the skip information is information which is calculated on the basis of the steps of:
calculating a maximum depth difference value which is a maximum value of difference values between a depth value of the decoding-target video unit and a converted depth value of the warped predicted depth video unit; and
determining whether an edge region is present in the video unit of a texture picture corresponding to the prediction-target depth video unit,
wherein the skip information is information which is determined by at least one of the steps of:
determining whether a value calculated using a first video rendering quality calculating method is greater than a first threshold value on the basis of the maximum depth difference value when an edge is present; and
determining whether a value calculated using a second video rendering quality calculating method is greater than a second threshold value on the basis of the maximum depth difference value when an edge is not present.

8. The video decoder according to claim 7, wherein the entropy decoding module is an entropy decoding module that decodes index information of a video unit or a picture used for the skip mode of the decoding-target video unit when a plurality of warped predicted depth video units or a plurality of reference pictures are used.

9. The video decoder according to claim 8, wherein the prediction module is a prediction module that uses depth information of one of the warped predicted depth video unit or the reference picture determined on the basis of the index information as depth information of the decoding-target video unit when the decoding-target video unit is decoded using the skip mode.

10. The video decoder according to claim 7, wherein the warping predicted depth video unit is a picture which is obtained by warping a depth picture having the same POC (Picture Order Count) as a prediction-target depth picture at a viewpoint of the prediction-target depth picture.

* * * * *